United States Patent [19]
Osada

[11] Patent Number: 5,905,703
[45] Date of Patent: *May 18, 1999

[54] OPTICAL DISK APPARATUS HAVING AN IMPROVED TRACKING CONTROL SYSTEM

[75] Inventor: Yutaka Osada, Fujisawa, Japan

[73] Assignee: Victor Company of Japan, Ltd., Yokohama, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/672,410

[22] Filed: Jun. 28, 1996

[30] Foreign Application Priority Data

Jun. 30, 1995 [JP] Japan .................................. 7-188083

[51] Int. Cl.$^6$ ............................................. G11B 7/09
[52] U.S. Cl. .................................. 369/44.41; 369/44.37; 369/44.35
[58] Field of Search ............................. 369/44.37, 44.41, 369/44.23, 44.34, 44.35, 44.29, 44.42; 250/201.5

[56] References Cited

U.S. PATENT DOCUMENTS 5,033,040  7/1991  Fujita .
5,282,192  1/1994  Yamada et al. .
5,363,358  11/1994  Yanagawa .

FOREIGN PATENT DOCUMENTS

| 0 324 949 A1 | 7/1989 | European Pat. Off. . |
| 40 29 040 A1 | 3/1991 | Germany . |
| 59-042673 | 3/1984 | Japan . |
| 1076540 | 3/1989 | Japan . |

*Primary Examiner*—Thang V. Tran
*Attorney, Agent, or Firm*—Michael N. Meller

[57] ABSTRACT

An optical disk apparatus for stable tracking and reproduction of information recorded on a high density disk, the apparatus cancels various noise components in the tracking error signal. Disturbances caused in the tracking error signal, such as crosstalk from adjacent tracks, the positional shift of the photo detectors due to a change of the ambient temperature, an inclination of the disk surface to a laser beam causing a defocus of the laser beam, and defects on a disk are eliminated. The optical disk apparatus has a light source, a diffraction grid, a semi-transparent prism, a collimator lens, an objective lens, a concave lens, a cylindrical lens, a photodetecting device, a reproduction control circuit, a tracking drive circuit, and an actuator for displacing the objective lens.

4 Claims, 5 Drawing Sheets

OPTICAL DISK APPARATUS HAVING AN IMPROVED TRACKING CONTROL SYSTEM

BACKGROUND OF THE INVENTION

1. Field of the Invention

The present invention relates to an optical disk (disc) apparatus, and more particularly to an improved tracking control system provided with 3-beam optical pickup.

2. Description of the Prior Art

Configuration and operation of conventional optical disk apparatus will be explained with reference to FIG. 1 and FIG. 2.

A plurality of information tracks are formed on a compact disk (CD), or on a CD-ROM (read only memory) disk spirally. To read the information tracks successively, an optical pickup from which a position error signal is produced, has to be driven to trace an intended track. By counting the produced position error signal, an optical beam of the optical pick up is controlled to reach the intended track, thereafter the optical beam is kept to trace the intended track by a tracking control servo system which operates so as to keep the position error signal zero. Then, the information recorded in the track is read out by the optical pickup. Thus, keeping the position error signal to be zero is an important function for an information memory disk apparatus.

For securing good tracing ability of the optical pickup, the optical disk apparatus is required to have a wide frequency reproducing range, and a large signal to noise ratio. To realize the above, the optical disk apparatus should have such functions as follows.

1) The tracking control servo system is not disturbed by low frequency components of a reproduced information signal.
2) To be resistant to a disturbance of signal recorded in adjacent tracks (crosstalk).
3) To be resistant to an effect of performance degradation of the optical disk apparatus as it ages, that is, a positional displacement of photodetectors for tracking by a change of ambient temperature, and a displacement of beam spot position on a disk due to deformation of associated optical system.
4) To be resistant to a change of impinging optical beam, being perpendicular to the disk surface, and a change of optimum focusing of the impinging optical beam spot on the disk surface.
5) To obtain a control servo system which is resistive to scratches on a disk surface.

In a CD player, a 3 beam system is generally utilized.

The 3 beam system is superior on the points of the above terms 3 and 4, thus is utilized in the CD player.

In order to cover the problem of the above term 1, the CD system employs the EFM (Eight to Fourteen Modulation) system in recording the signal, but takes no countermeasure to the above term 2 because the CD format has low recorded signal density and thus the term 2 poses no problem, further, the CD system takes a countermeasure to the above term 5 by employing an improved electric circuit which is effective enough for the low recorded signal density.

Conventional methods of the 3 beam system and a 1 beam push-pull system will be explained hereafter.

Figure 5A:
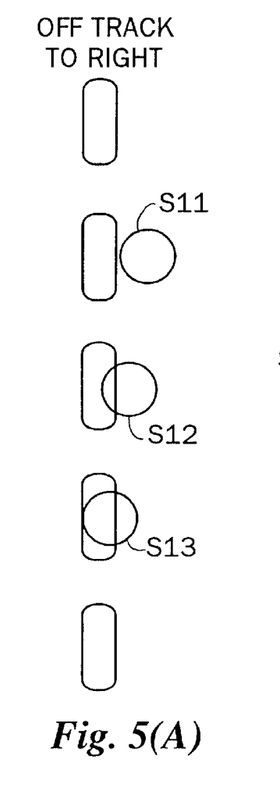
FIGS. 5(A), 5(B), and 5(C) show rough operation of a 3-beam type of tracking control system.
Figure 5B:
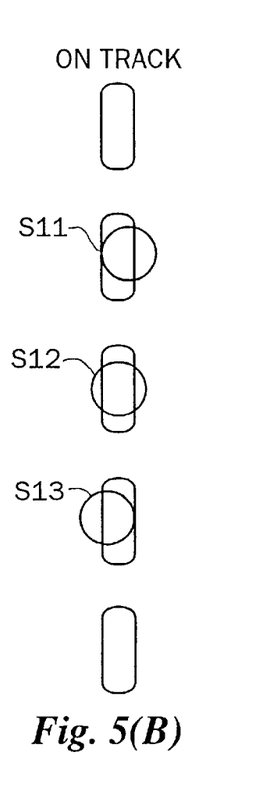
Figure 5C:
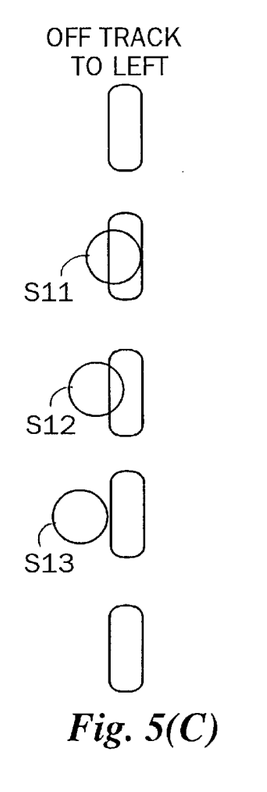
Figure 6:
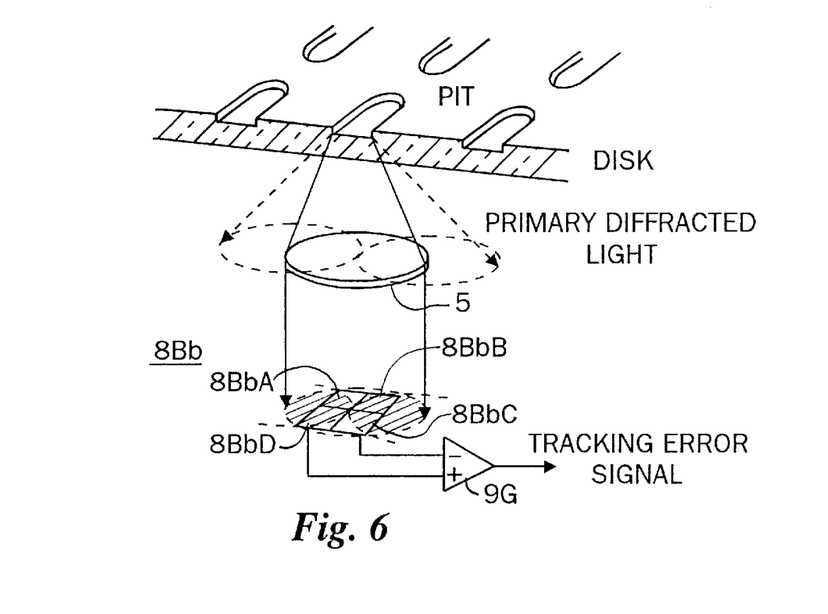
FIG. 6 shows a schematic view of a 1-beam push-pull type of tracking control system.

FIGS. 5(A) through 5(C) show an operation of 3 beam system. FIG. 6 illustrates 1 beam push-pull system. FIG. 1 shows a block diagram of a conventional tracking servo system. FIG. 2 shows a block diagram of a conventional photodetection and reproduction control circuit.

A conventional optical disk apparatus 100 will be explained referring to FIG. 1. In FIG. 1, 1 is a light source, 2 a diffraction grid, 3 a semi-transparent prism, 4 a collimator lens, 5 an objective lens, 6 a concave lens, 7 a cylindrical lens, 8 a photodetecting device, 9 a reproduction control circuit, 10 a tracking drive circuit, 11 an actuator, D a disk, and D1 a disk surface.

The operation of the conventional optical disk apparatus 100 will be explained as follows referring to FIG. 1.

A light beam projected from the light source 1 passes through the diffraction grid 2, then is incident on the semi-transparent prism 3. The half of the light beam passes through the semi-transparent prism 3 in the direction of the collimator lens 4. The light beam is made to be parallel by the collimator lens 4 and is incident on the objective lens 5. The light beam is focused by the objective lens 5 on a track formed on the disk surface D1 of the disk D. The light beam is reflected by the disk surface D1 of the disk D and back-tracks the objective lens 5 and the collimator lens 4. Then the reflected light beam is incident on the the semi-transparent prism 3 and reflected toward the concave lens 6. The reflected light beam is enlarged to a predetermined magnification by the concave lens 6, passes through the cylindrical lens 7, and irradiates the photodetecting device 8. The photodetecting device 8 converts photoenergy of the incident light beam into electronic energy, and outputs it to the reproduction control circuit 9.

Figure 1:
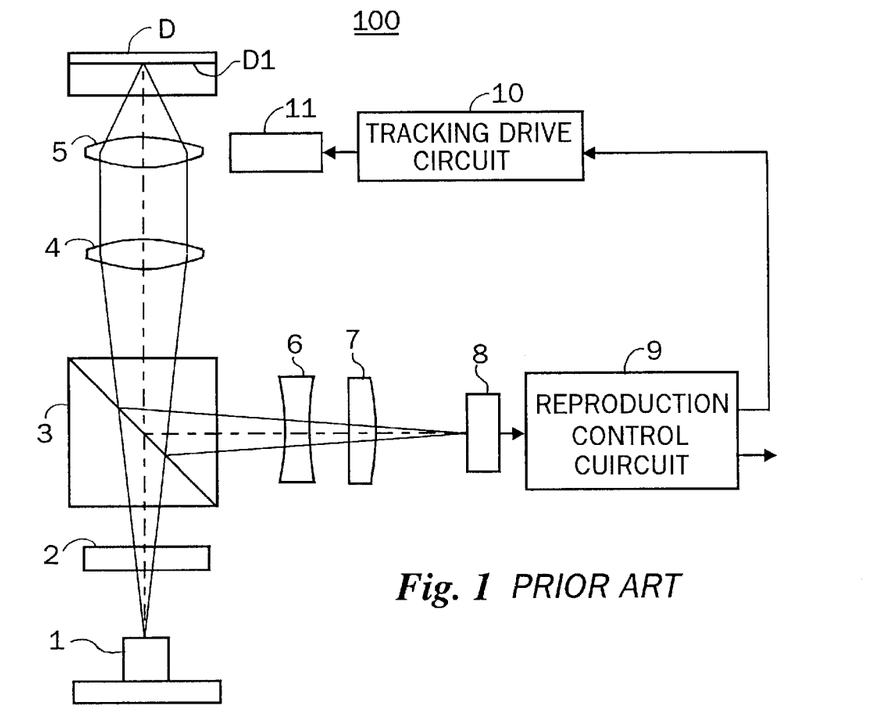
FIG. 1 shows a block diagram of a conventional tracking servo system.

When a 3-beam tracking system is applied to the servo system of FIG. 1, a main beam and 2 sub-beams are produced as the beam generated by the light source through the diffraction grid 2.

A projected image on a disk surface D1 of light beams of the 3 beam system of the disk apparatus 100, guided from the objective lens 5 to the disk surface D1, is shown in FIGS. 5(A) through 5(C). In FIGS. 5(A) to 5(C), S12 is a main beam spot for reproduction of recorded information, and S11 and S13 are sub-beam spots for detecting tracking error of the main beam spot S12. Moreover, FIG. 6 shows a schematic view of the photodetecting device 8 and the reproduction control circuit 9.

Figure 2:
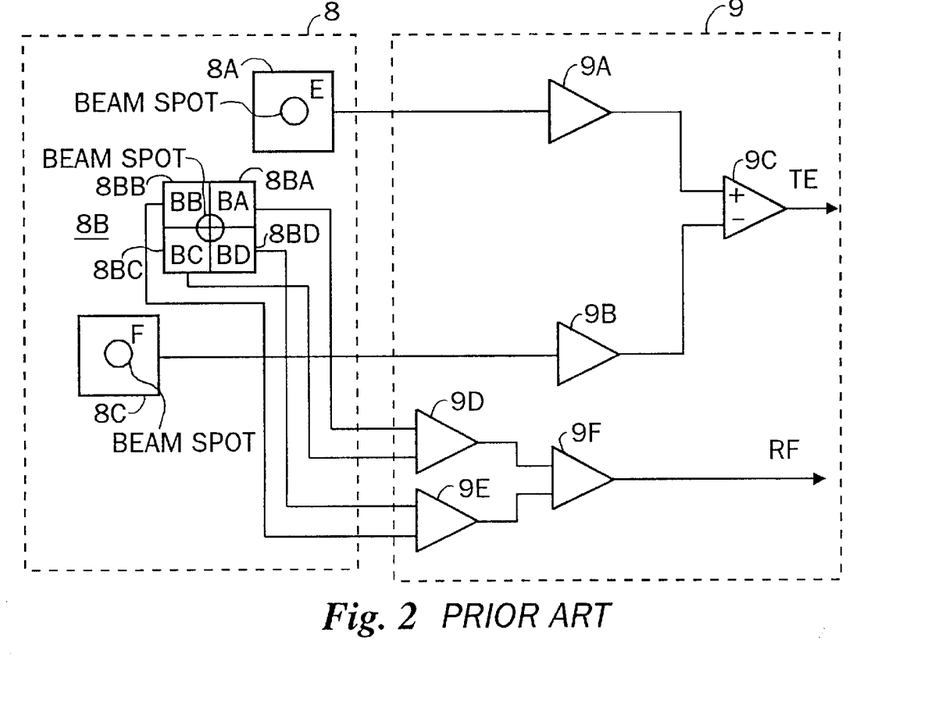
FIG. 2 shows a block diagram of a conventional photo-detection and a reproduction control circuit.

In case that the optical disk apparatus 100 employs a 3-beam tracking system, photodetection and reproduction control circuit is shown in FIG. 2, in which the photodetecting device 8 consist of a first and a second photodetectors 8A, 8C respectively, and a 4-division photodetector 8B. The first photodetector 8A receives the sub-beam spot 11 (shown in FIGS. 5(A) to 5(C)) which is reflected from the disk surface D1 and passes through the objective lens 5, the collimator lens 4, the semi-transparent prism 3, the concave lens 6, and the cylindrical lens 7, and outputs an electronic signal therefrom. The 4-division photo detector 8B receives the main beam spot S12 reflected from the disk surface D1, passing through the objective lens 5, the collimator lens 4, the semi-transparent prism 3, the concave lens 6, and the cylindrical lens 7, and outputs 4 separate electric signals therefrom.

Precisely, the 4-division optical detector 8B has 4 divisional photodetectors, 8BA, 8BB, 8BC, and 8BD.

The outputted electric signals of the photodetectors 8A and 8C are amplified by a first and a second amplifiers 9A and 9B respectively, and supplied to a positive terminal and a negative terminal of a comparator 9C respectively, which outputs a difference of the above 2 outputted electric signals as a tracking error signal to the tracking drive circuit 10. The tracking drive circuit 10 drives the actuator 11 which moves the objective lens 5 so as to make the tracking error signal zero.

As mentioned above, the main beam spot S12 is received by the 4 division photodetectors 8BA through 8BD. Two signals outputted respectively from the photodetectors 8BA and 8BC are added each other by an adder 9D. Another pair of signals outputted respectively from the photodetectors 8BD and 8BB are added each other by an adder 9E. Two outputs from the adders 9D and 9E are further added each other by an adder 9F to form an RF signal which is subsequently supplied to an amplifier (not shown). Generally, a reflected beam strength is more weak when it is on a pit of the disk surface D1 than when it isn't.

In FIG. 5(A), if the 3 beams landed are off track to the right side, the strength of the reflected sub-beam spot S13 is weaker than that of the sub-beam spot S11. Then the comparator 9C outputs a tracking error signal according to the difference in strength between the reflected sub-beams S1 and S13. In FIG. 5(B), when the 3 beams irradiate the pit track symmetrically, the strengths of the reflected sub-beam spots S11 and S13 are equal to each other, then the comparator 9C outputs nothing. In FIG. 5(C), when the 3 beams landed are off track to the left side, the strength of the reflected sub-beam spot S13 is stronger than that of the sub-beam spot S11, then the comparator 9C outputs the error signal according to the difference between the strength of the 2 sub-beam spots S11 and S13.

When the optical disk apparatus 100 employs a 1 beam push-pull tracking system, a light beam traces a pit track on a disk surface D1 of disk D as shown in FIG. 6. As the track pitch of the optical disk D is almost equal to the wavelength of the light source 1, such tracks act as a diffraction grating. In FIG. 6, in addition to an original light beam, only first order diffracted components are shown as they are dominant. On a 4 divisional optical detector 8Bb, the original light beam and the first order diffracted components are superimposed each other (shown as hatched areas in FIG. 6), and a tracking error signal is derived by analysing the added value. In this system, the 4 divisional optical detector 8Bb has divisional photodetectors 8BbA through 8BbD similar to the structure of the detector 8B. Added output of the divisional photodetectors 8BbA and 8BbD is supplied to a positive terminal of a comparator 9G, and added output of the divisional photo detector 8BbB and 8BbC is supplied to a negative terminal of the comparator 9G, then the comparator 9G outputs the tracking error signal according to the difference of them, supplying it to the tracking drive circuit 10.

In recent years, optical information recording technology has made a remarkable progress.

High density information recording requires a narrow pitched tracks and small pits. For such high density recording, prior arts had problems as follows.

In the CD recording format, a signal level in a low frequency range is made to be smaller than that in another frequency range (a peak resides between 3T and 11T, wherein T denotes a unit bit period) for reducing low frequency signal components, and this method is called Eight to Fourteen Modulation (EFM). In detail, some bits are added for this purpose, according to the technology called Digital Sum Variation (DSV) control. However, the number of these added bits has to be cut down for increasing a linear recording density. As a result, the level of low frequency signal component will increase, because the low frequency signal components become close to the above peak. For the 3 beam system, the signal of this low frequency signal components behave as a large noise to the tracking error signal, and prevents the optical disk apparatus from its stable tracking and track-access controls.

Hereafter, effects of the low frequency components on a stability of an optical disk apparatus will be explained.

Figure 7A:
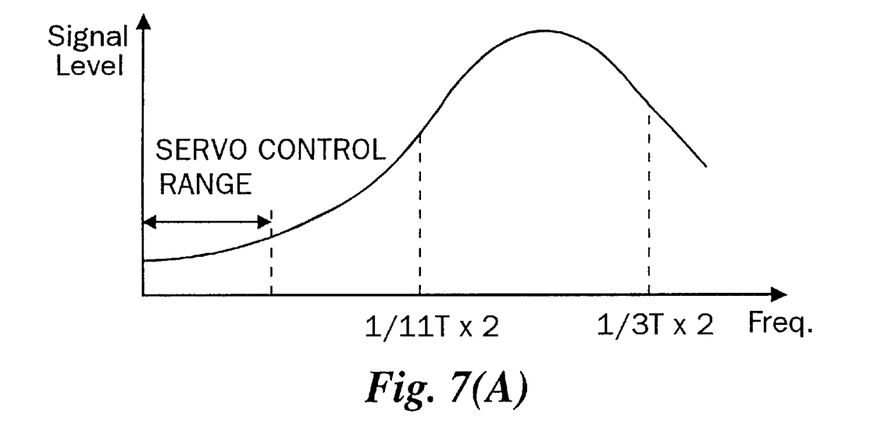
FIG. 7(A) shows a frequency spectrum of reproduced signals.

In the CD system, digitized information are recorded in the EFM format on a disk surface forming pits in a form of track, of which a length of pit varies 3T to 1T. In reproduction, by irradiating a laser beam on a track, a pit length and a land length are detected, and digitized information is reproduced as EFM demodulation. FIG. 7(A) shows a frequency power spectrum of reproduced signal.

A signal's frequency component is expressed as a reciprocal of the sum of a pit length and a land length. In the frequency range between 1/11T×2 and 1/3T×2, the signal is high, and in other range, its level is low, as shown in FIG. 7(A). A frequency range for tracking servo control is indicated in FIG. 7(A), and when a reproduced signal falls into this frequency range, it disturbs the servo control as a noise causing a tracking error.

Figure 7B:
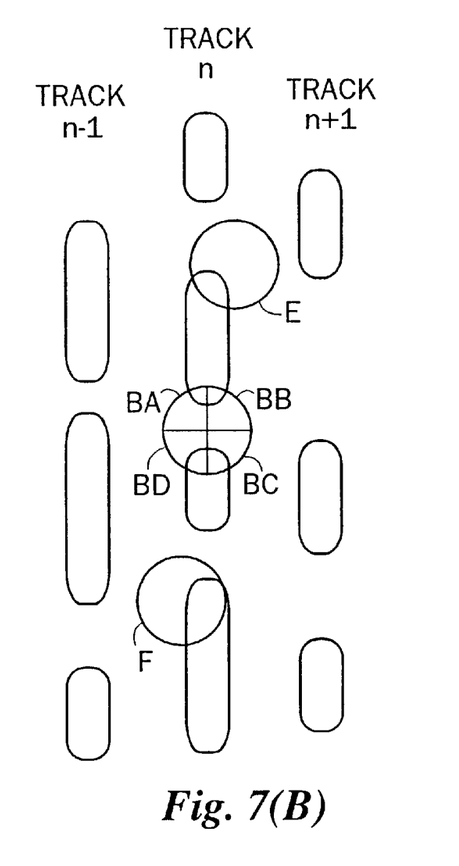
FIG. 7(B) is a plan view of beam spot of a 3-beam type tracking control system.
Figure 7C:
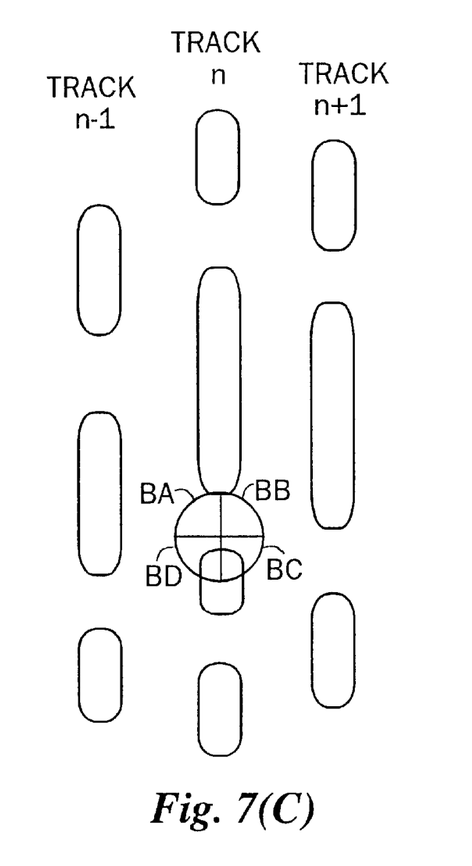
FIG. 7(C) is a plan view of beam spot of a 1-beam push-pull type tracking control system.

Such tracking error mechanism will be explained with reference to FIGS. 7(B) and 7(C), in which recorded pits and a land portion are shown. FIG. 7(B) shows beam spots of the 3 beam system, and FIG. 7(C) shows a beam spot of the 1 beam push-pull system. In FIG. 7(B), characters BA through BD, E and F correspond to the photodetectors in FIGS. 2 and 4. In FIG. 7(C), characters BA through BD, correspond to the photodetectors 8BbA to 8BbD in FIG. 6.

Tracking error (TE) signal of the 3 beam system is expressed as Eq.(1), where "E" and "F" represent outputs of the corresponding photodetectors.

$$TE = E - F \qquad (1)$$

Tracking error signal of the 1 beam push pull system is expressed as Eq.(2), where "BA" through "BD" represent outputs of the corresponding photodetectors.

$$TE = (BA + BD) - (BB + BC) \qquad (2)$$

In the 3 beam system, laser beam spots E and F are positioned apart each other, therefore, spots E and F are reflected by different pits respectively, this causes that detected signals of E and F generally contain different pit information each other, thus, a high frequency component of the TE is not cancelled by mixing E and F. Then, the servo system is subject to the high frequency component of these pit information.

In the 1 beam push pull system, the laser beam spot landing on the photodetectors BA and BB, BC and BD is a reflection of a same pit and Eq.(2) teaches that pit information is canceled. This means that high frequency components included in the TE is small, thus, it is much less influencial particularly to the servo system which operates in the low frequency region.

Shortcomings of the tracking control system of the 3 beam system are following.
1) The tracking error signal is subject to a low frequency crosstalk of pit information.
2) The tracking system is vulnerable to a crosstalk from adjacent tracks as the track pitch is becoming small.
3) Occurrence of unintended track jam or skip.

The 1 beam push-pull system does not have shortcomings mentioned the above 1) through 3), but has other shortcomings as follows.
4) A performance degradation as it ages.
5) Positional displacement of the photodetectors by the change of the ambient temperature.
6) A tolerance of inclination of the disk surface is small, which leads to that a tolerance of defocus of the laser beam is small.

SUMMARY OF THE INVENTION

Accordingly, it is a general object of the present invention to provide an improved optical disk apparatus of the 3 beam type of tracking control system which eliminates the aforementioned shortcomings by combining a benefit of the 3 beam system with a benefit of the 1 beam push-pull system.

Another and specific object of the present invention is to provide an optical disk apparatus for stably playing a high density optical disk.

An optical disk apparatus of the present invention is for reproducing information on an optical disk by utilizing a main beam for detecting information on a disk surface and first and second sub-beams for detecting a tracking error of the main beam, the optical disk apparatus comprising, a light source emitting a light beam and irradiating the disk surface, an objective lens focusing the main beam and the first and second sub beams on the disk surface, an actuator for displacing the objective lens so as to move the main beam and the sub beams in a radial direction of the optical disk, a 4-division optical detector divided into 4 sections for sensing the main beam reflected from the disk surface and outputting 4 divisional electric signals of first, second, third and fourth divisional signals, first and second optical detectors for sensing first and second sub beams respectively and outputting first and second detected signals respectively, a first subtracter for subtracting the second detected signal of the second sub-beam from the first detected signal of the first sub-beam and outputting a first subtracted signal, a low-pass filter (LPF) for passing low frequency component of the first subtracted signal, where frequencies of the low frequency components are lower than a predetermined value, a first adder for adding the first divisional signal to the fourth divisional signal and outputting a first added signal, a second adder for adding the second divisional signal and the third divisional signal and outputting a second added signal, a second subtracter for subtracting the second added signal from the first added signal and outputting a second subtracted signal, a high-pass filter (HPF) for passing high frequency components of the second subtracted signal, where frequencies of the high frequency components are higher than a predetermined value, a third adder for adding outputs of the LPF and the HPF together and outputting a tracking error signal, and a tracking drive circuit for controlling the actuator displacing the objective lens.

Another optical disk apparatus of the present invention is for reproducing information on an optical disk by utilizing a main beam for detecting information on a disk surface and first and second sub-beams for detecting a tracking error of the main beam, the optical disk apparatus comprising, a light source emitting a light beam and irradiating the disk surface, an objective lens focusing the main beam and the first and the second sub-beams on the disk surface, an actuator for displacing the objective lens so as to move the main beam and the sub beams in a radial direction of the optical disk, a 2-division optical detector divided into 2 sections for sensing the main beam reflected from the disk surface and outputting 2 divisional electric signals of first and second divisional signals, first and second optical detectors for sensing first and second sub-beams respectively and outputting first and second detected signals respectively, a first subtracter for subtracting the second detected signal of the second sub-beam from the first detected signal of the first sub-beam and outputting a first subtracted signal, a low-pass filter (LPF) for passing low frequency component of the first subtracted signal, where frequencies of the high frequency components are lower than a predetermined value, a second subtracter for subtracting the second divisional signal from the first electric divisional signal and outputting a second subtracted signal, a high-pass filter (HPF) for passing high frequency components of the second subtracted signal, where frequencies of the high frequency components are higher than the predetermined value, an adder for adding outputs of the LPF and HPF together and outputting a tracking error signal, and a tracking drive circuit for controlling the actuator displacing the objective lens.

DETAILED DESCRIPTION OF THE PREFERRED EMBODIMENT

[1st Embodiment]

Figure 3:
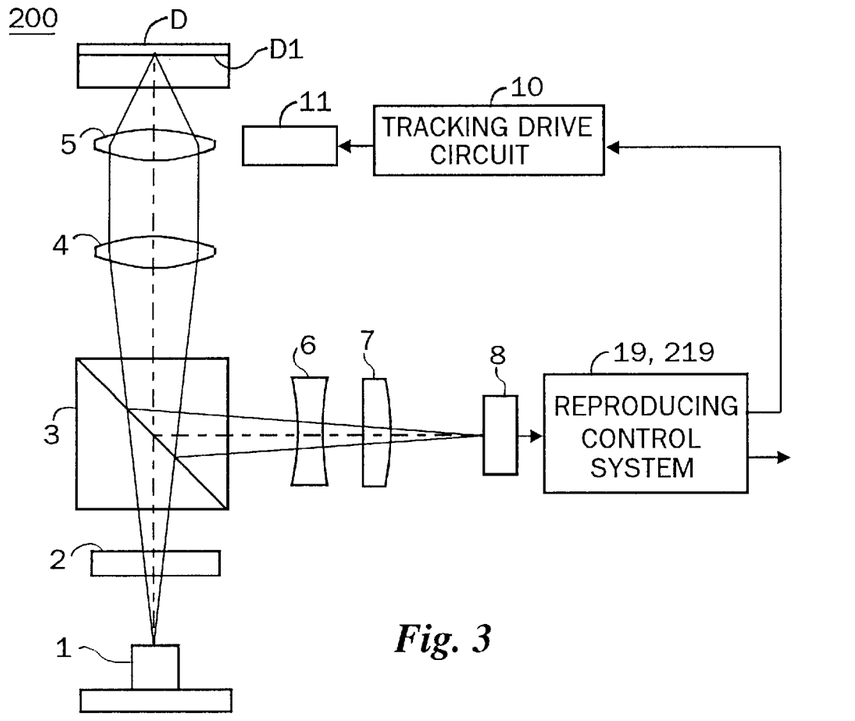
FIG. 3 shows a schematic diagram of an optical disk apparatus of first and second embodiments of the present invention.

Optical disk apparatus according to a first embodiment of the present invention will be described in detail with reference to the FIGS. 3 and 4, in which same reference numerals and symbols are used to denote like or equivalent elements used in the aforementioned prior arts, and detailed explanation of such elements are omitted for simplicity.

Optical disk apparatus of first embodiment of the present invention employs a 3-beam type of tracking control system.

An optical disk apparatus 200 of first embodiment of the present invention will be explained with reference to FIG. 3. In FIG. 3, 1 is a light source, 2 a diffraction grid, 3 a semi-transparent prism, 4 a collimator lens, 5 an objective lens, 6 a concave lens, 7 a cylindrical lens, 8 a photodetecting device, 19 a reproduction control circuit, 10 a tracking drive circuit, 11 an actuator, D a disk, and D1 a disk surface. The photodetecting device 8 receives a light beam from the cylindrical lens 7 and outputs electric signal to the reproduction control circuit 19.

Figure 4:
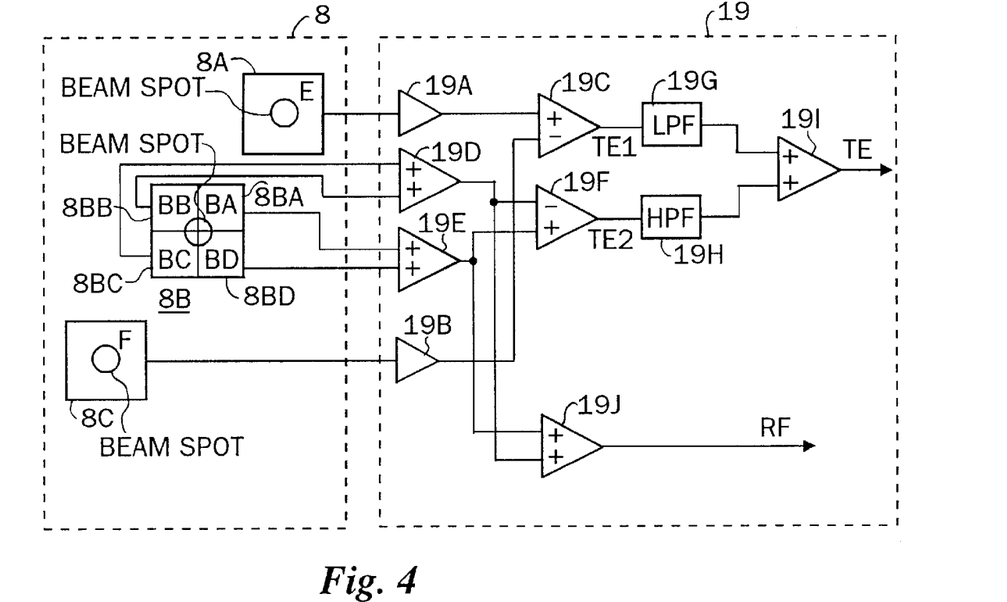
FIG. 4 shows a schematic diagram of photodetectors and a reproducing system used in the first embodiment of the present invention.

FIG. 4 shows the photodetecting device 8 and the reproduction control circuit 19 used in the first embodiment of the present invention.

As shown in FIG. 4, the photodetecting device 8 consist of photodetectors 8A, 8B, and 8C. The photodetector 8A receives a sub-beam S11(shown in FIG. 5(A) through 5(C)) which is reflected by the disk surface D1 and passes through the objective lens 5, the collimator lens 4, the semitransparent prism 3, the concave lens 6, and the cylindrical lens 7, and outputs a first detected signal. Similarly, the photodetector 8C receives another sub-beam S13 (shown in FIGS. 5(A) through 5(C)) which is reflected by the disk surface D1 and passes through the objective lens 5, the collimator lens 4, the semi-transparent prism 3, the concave lens 6, and the cylindrical lens 7, and outputs a second detected signal. The photodetector 8B is a 4-division optical detector which receives a main beam S12 reflected by the disk surface D1, passing through the objective lens 5, the collimator lens 4, the semi-transparent prism 3, the concave lens 6, and the cylindrical lens 7, and outputs its electric signals.

Precisely, the 4-division photo detector 8B has 4 divisional photodetectors, 8BA, 8BB, 8BC, and 8BD.

A first and a second amplifiers 19A, 19B receive the first and second detected signals which are outputted from the photodetectors 8A and 8C respectively, and amplify them to predetermined levels respectively. The first amplifier 19A supplies a first amplified signal to a positive terminal of a first comparator 19C, and the second amplifier 19B supplies a second amplified signal to a negative terminal of the first comparator 19C. The first comparator 19C subtracts the second amplified signal from the first amplified signal and supplies a result as a subtracted signal TE1 to a low-pass filter (LPF) 19G. The LPF 19G supplies a filtered signal to one of the terminals of a first adder 19I.

Outputs from the divisional photodetectors 8BB and 8BC are supplied to an added together by a second adder 19D, and outputs from the divisional photodetectors 8BA and 8BD supplied to and added together by a third adder 19E. The adders 19D and 19E supply added signals to negative and positive terminals of a second comparator 19F respectively. The second comparator 19F outputs a subtracted signal TE2 to a high-pass filter (HPF) 19H. The HPF 19H supplies a filtered signal to another terminal of the first adder 19I. The first adder 19I supplies an added signal as a tracking error signal TE to the tracking drive circuit 10 (shown in FIG. 3). Then the tracking drive circuit 10 drives the actuator 11 so as to produce the tracking error signal to be zero.

The second and third adders 19D and 19E also supply respective added signals to a fourth adder 19J. The fourth adder 19J outputs an added signal as a reproducing RF signal to a reproducing circuit (not shown).

It is required that the LPF 19G and the HPF 19H have following characteristics respectively.

Cut-off frequencies of the LPF 19G and the HPF 19H are to be determined in consideration of the power spectra of the signals TE1 and TE2 respectively.

Noise of the signal TE1 increases over 1 kHz, and noise of the signal TE2 increases below 100 Hz. Therefore, the cut-off frequencies of the LPF 19G for the signal TE1 and of the HPF 19H for the signal TE2 are desirable to be between 300 and 700 Hz. In the following explanation, the cut-off frequencies of the LPF 19G and the HPF 19H are selected equally to be 500 Hz.

The servo control system requires its operating frequency range of DC to about 50 kHz (FIG. 7(A)).

The reason that the tracking error signal TE solves the problems mentioned before will be explained hereafter referring to FIGS. 3 and 4.

In FIG. 4, an ideal tracking signal without containing noise is denoted as TE0. High frequency noise components included in the tracking error signal is denoted as NH.

Such noise components include low frequency components of the RF signal and the crosstalk components from the adjacent tracks. On the other hand, low frequency component of the same is denoted as NL, which is caused by a tilt of the disk surface D1 to the light beam, a displacement of the photodetector 8B, and a defocus associated with the optical system including the light source 1, the diffraction grid 2, the semi-transparent prism 3, the collimator lens 4, the objective lens 5, the concave lens 6, and the cylindrical lens 7.

In the 3-beam system, signals detected by the first and the second photodetectors 8A and 8C are named E and F respectively. The levels of signals E and F are generally asymmetrical each other in the 3-beam system, and each of the signals E and F mainly contains a reproduced signal and a cross talk components. Therefore, in the tracking error signal TE1 which is obtained by subtracting the signal F from the signal E, the crosstalk components is not cancelled out and has high frequency components predominantly. Thus, a high frequency noise components NH of the tracking error signal TE1 is larger than a low frequency noise component NL of the tracking error signal TE1.

On the other hand, the tracking error signal TE2 detected by the 4-division photodetector 8B is mainly caused by a tilt of the disk surface D1 to the light beam, and of the optical system including the light source 1, the diffraction grid 2, the semi-transparent prism 3, the collimator lens 4, the objective lens 5, the concave lens 6, and the cylindrical lens 7, and the noise generated by abovementioned causes contain have low frequency components predominantly. Thus, the low frequency noise components NL of the tracking error signal TE2 are larger than the high frequency noise components NH of the tracking error signal TE2. The photodetectors 8BA, 8BB, 8BC, and 8BD output detected signals BA, BB, BC, and BD respectively, A tracking error signal TE0 contains no noise components such as the high frequency noise components NH and the low frequency noise components NL.

The tracking error signal TE1 is given below.

$$TE1 = E - F \qquad (3)$$

As the noise of the tracking error signal TE1 is almost equal to the high frequency noise components NH, the tracking error signal TE1 can be expressed:

$$TE1 = TE0 + NH \qquad (4)$$

On the other hand, the tracking error signal TE2 is expressed as:

$$TE2 = (BA + BD) - (BB + BC) \qquad (5)$$

Where BA through BD respectively represent outputs of the corresponding photodetectors.

As the noise of the tracking error signal TE2 is almost equal to the low frequency noise components NL, the tracking error signal TE2 can be expressed:

$$TE2=TE0+NL \quad (6)$$

In this embodiment, the eight to fourteen modulation is applied. The frequency ranges of the tracking error signals TE1 and TE2 are widely separated each other. In the above, the high frequency noise components NH are higher than 1 kHz and the low frequency noise components NL are lower than 100 Hz.

A cut off frequency fc which is much lower than the frequency of the high frequency noise components NH, and much larger than the frequency of the low frequency noise components NL.

A time constant T of the fc is given as:

$$T=1/2\pi fc \quad (7)$$

A transfer function F1(jω) of the LPF 19G is given below.

$$F1(j\omega)=1/(1+j\omega T) \quad (8)$$

A transfer function F2(jω) of the HPF 19H is given below.

$$F2(j\omega)=j\omega T/(1+j\omega T) \quad (9)$$

Then, the tracking error signal TE becomes:

$$\begin{aligned} TE &= TE1 \times F1(j\omega) + TE2 \times F2(j\omega) \\ &= TE0(F1(j\omega)+F2(j\omega)) + NH \times F1(j\omega) + NL \times F2(j\omega) \end{aligned} \quad (10)$$

When Eq.(8) and Eq.(9) are added together, it becomes as follows:

$$F1(j\omega)+F2(j\omega)=1 \quad (11)$$

The following equation is obtained by substituting Eq. (11) for Eq.(10).

$$TE=TE0+NH \times F1(j\omega)+NL \times F2(j\omega) \quad (12)$$

The following relations are obtained by examining to Eqs. (7), (8), and (9).

$$NH \times F1(j\omega) << NH \quad (13)$$

$$NL \times F2(j\omega) << NL \quad (14)$$

From Eqs. (12), (13), and (14), it is possible to deem that TE is almost equal with TE0. This proves that the present invention realizes to provide an improved optical disk apparatus which overcomes shortcomings of both the 3-beam system and the 1-beam push pull system, and can stably play a disk with improvements shown below.

1) Free from the disturbance by noise components of TE.
2) Resistant to the disturbance by a cross talk.
3) Resistant to undesired displacement of the photo) detectors due to a change of the ambient temperature.
4) Resistant to the disturbance by the inclination of the disk surface to the beam causing defocus of the laser beam spot.
5) Resistant to the disturbance by defects on the disk.

[2nd Embodiment]

Figure 8:
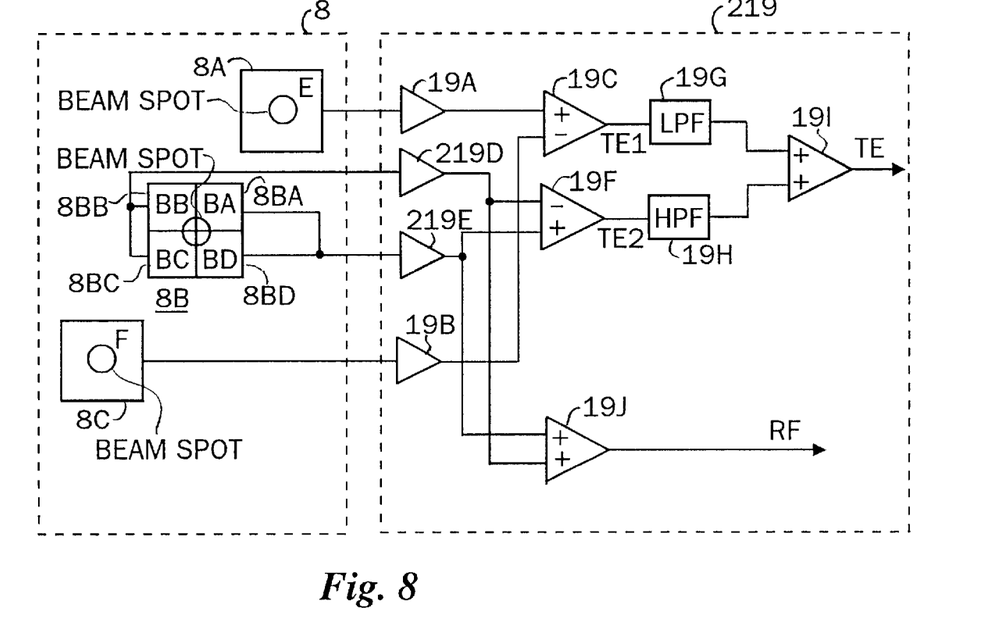
FIG. 8 shows a schematic diagram of photodetectors and a reproducing system used in a second embodiment of the present invention.

Next, a second embodiment of the present invention will be explained with reference to FIGS. 3 and 8. In the second embodiment, a portion of the first embodiment is modified as follows. The reproduction control circuit 19 (FIG. 3) is now replaced with a reproduction control circuit 219 (FIGS. 3 and 8) which employs amplifiers 219D and 219E in place of adders 19D and 19E as shown, the rest of the reproduction control circuit 219 is identical to that denoted as 19. The same photodetector 8B having 4 divisional photodetectors 8BA, 8BB, 8BC and 8BD is employed in this second embodiment, however the divisional photodetectors 8BA and 8BD are directly connected together to produce a first combined output thereof, and the divisional photodetectors 8BB and 8BC are directly connected together to produce a second combined output thereof as shown in FIG. 8. The first and second combined outputs are supplied respectively to the amplifiers 219D and 219E, an output of the amplifier 219D is supplied to the negative terminal of the second comparator 19F and also to one terminal of the fourth adder 19J, an output of the amplifier 219E is supplied to the positive terminal of the second comparator 39F and also to another terminal of the fourth adder 19J. Otherwise, signal processing in the reproduction control circuit 219 is same as that in the reproduction control circuit 19 of the first embodiment. Accordingly, the same performance as that of the first embodiment is obtained with a simpler circuit arrangement in comparison.

Figure 9:
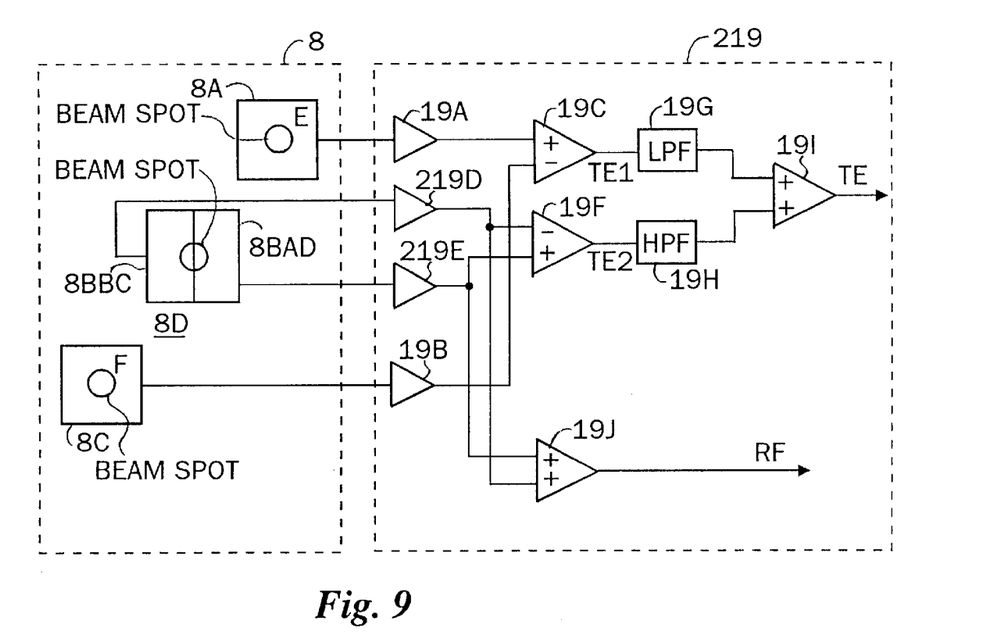
FIG. 9 shows a schematic diagram of a 2-division optical photodetector.

In this second embodiment, a 4-division photodetector is employed, however, as shown in FIG. 9, a simpler 2-division photodetector 8D may be used in place of the 4-division photodetector 8B by making the divisional photodetectors 8BA and 8BD into a single photodetecting section 8BAD and 8BB and 8BC into another single photodetecting section 8BBC, so that the circuit construction is simplified and no hard wires to connect them are necessary.

According to the embodiments of the present invention, it is disclosed that the optical disk apparatus of the present invention has advantages of stable tracking and reproducing information recorded on a high density disk, which is resistant to the disturbance caused to the tracking error signal TE, the crosstalk from the adjacent track, an unintended positional shift of the photodetectors due to a change of the ambient temperature, an inclination of the disk surface to the beam causing a defocus of the laser beam, and defects on the disk.

What is claimed is:

1. An optical disc apparatus for reproducing signal information from a high density optical disk having a smaller track pitch than that of a compact disc (CD) format and a higher data density along a track than that of the CD format, said apparatus having a main beam of light for detecting the information on a disk surface of the optical disk by tracking the track of said optical disk, and first and second sub-beams for detecting errors in tracking said main beam of light, said optical disk apparatus comprising, a light source emitting the main beam of light and the first and second sub-beams, said main beam of light and said first and second sub-beams irradiating said disk surface, an objective lens focusing said main beam of light and said first and second sub-beams on said disk surface, an actuator for displacing the objective lens so as to move said main beam of light and said first and second sub-beams in a radial direction along the optical disk, a 4-division optical detector divided into 4 sections for sensing the main beam reflected from the disk surface and outputting 4 divisional electric signals of first, second, third and fourth divisional signals, first and second optical detectors for sensing respectively said first and second sub-beams reflected from the disk surface and outputting first and second detected signals respectively, a first subtracter for subtracting said second detected signal from said first detected signal and outputting a first subtracted signal, a low-pass filter for passing low frequency components of said first subtracted signal where frequencies of the low frequency components are lower than frequencies of said information signal reproduced by the 4-division optical detector, said low-pass filter having a predetermined cut-off frequency range of 300 Hz to 700 Hz, first adding means for adding said first divisional signal to said fourth divisional signal and outputting a first added signal, second adding means for adding said second divisional signal and said third divisional signal and outputting a second added signal, a second subtracter for subtracting said second added signal from said first added signal and outputting a second subtracted signal, a high-pass filter having said predetermined cut-off frequency range of 300 Hz to 700 Hz for passing high frequency components of said second subtracted signal, where frequencies of the high frequency components are higher than said frequencies of the low frequency components and lower than said frequencies of said information signal, a third adding means for adding an output of said low-pass filter to an output of said high-pass filter and outputting a tracking error signal, and a tracking drive circuit driving said actuator for displacing said objective lens.

2. An optical disc apparatus claimed in claim 1, wherein said predetermined cut-off frequency is substantially lower than frequencies of high frequency noise components included in a tracking error signal, and substantially higher than frequencies of low frequency noise components included in said tracking error signal, and a time constant of said predetermined cut-off frequency is given by $1/2\pi c$ where fc is said predetermined cutoff frequency.

3. An optical disc apparatus for reproducing information signal from a high density optical disk having a smaller track pitch than that of a compact disc (CD) format and a higher data density along a track than that of the CD format, said apparatus having a main beam of light for detecting the information on a disk surface of the optical disk by tracking the track of said optical disk, and first and second sub-beams for detecting a tracking error of said main beam, said optical disk apparatus comprising, a light source emitting the main beam and the first and second sub-beams, said main beam and said first and second sub-beams irradiating said disk surface, an objective lens focusing said main beam and said first and second sub-beams on said disk surface, an actuator for displacing the objective lens so as to move said main beam and said first and second sub-beams in a radial direction of the optical disk, a 2-division optical detector divided into 2 sections for sensing the main beam reflected from the disk surface and outputting 2 divisional electric signals of first and second divisional signals, first and second optical detectors for sensing respectively first and second sub-beams reflected from the disk surface and outputting first and second detected signals respectively, a first subtracter for subtracting said second detected signal from said first detected signal and outputting a first subtracted signal, a low-pass filter for passing low frequency components of said first subtracted signal where frequencies of the low frequency components are lower than frequencies of said information signal reproduced by the 2-division optical detector, said low-pass filter having a predetermined cut-off frequency range of 300 Hz to 700 Hz, a second subtracter for subtracting said second divisional signal from said first divisional signal and outputting a second subtracted signal, a high-pass filter having said predetermined cut-off frequency range of 300 Hz to 700 Hz for passing high frequency components of said second subtracted signal where frequencies of the high frequency components are higher than said frequencies of the low frequency components and lower than said frequencies of said information signal, an adding means for adding an output of said low-pass filter to an output of said high-pass filter and outputting a tracking error signal, and a tracking drive circuit displacing said objective lens for driving said actuator for displacing said objective lens.

4. An optical disc apparatus claimed in claim 3, wherein said predetermined cut-off frequency is substantially lower than frequencies of high frequency noise components included in a tracking error signal, and substantially higher than frequencies of low frequency noise components included in said tracking error signal, and a time constant of said predetermined cut-off frequency is given by $1/2\pi fc$ where fc is said predetermined cutoff frequency.

* * * * *